United States Patent
Hayashida et al.

(12) 
(10) Patent No.: US 6,458,859 B2
(45) Date of Patent: Oct. 1, 2002

(54) SEMICONDUCTIVE SILICONE RUBBER COMPOSITION AND SILICONE RUBBER ROLL

(75) Inventors: Osamu Hayashida; Tsutomu Nakamura, both of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 4 days.

(21) Appl. No.: 09/731,846

(22) Filed: Dec. 8, 2000

(30) Foreign Application Priority Data

Dec. 10, 1999 (JP) .......................... 11-351246

(51) Int. Cl.$^7$ .............................. C08J 9/04; C08K 3/22
(52) U.S. Cl. .................. 521/92; 252/507; 252/509; 521/110; 521/112; 521/123; 521/125; 521/126; 521/154; 524/413; 524/588; 524/783
(58) Field of Search .................. 521/92, 123, 125, 521/126, 110, 112, 154; 524/413, 588, 783; 252/507, 509

(56) References Cited

FOREIGN PATENT DOCUMENTS

| JP | 63-86205 | 4/1988 |
|---|---|---|
| JP | 6-192486 | 7/1994 |
| JP | 8-120176 | 5/1996 |
| JP | 10-176111 | 6/1998 |

OTHER PUBLICATIONS

Journal of applied polymer science, vol. VI, Issue No. 24: "Internal Field Emission in Carbon Black–Loaded Natural Rubber Vulcanizates", L.K.H. Van Beek, Central Laboratory T.N.O., Delf, Holland and B.I.C.F. Van Paul, Rubber Research Institute T.N.O., Delft, Holland: pp. 651–655 (1962).

*Primary Examiner*—Morton Foelak
(74) *Attorney, Agent, or Firm*—Birch, Stewart, Kolasch & Birch, LLP

(57) ABSTRACT

By blending acicular conductive titanium oxide and an antistatic agent having a metal ion-containing moiety in an organopolysiloxane having at least two aliphatic unsaturated groups, there is obtained a silicone rubber composition which is curable with an organic peroxide and/or an organohydrogenpolysiloxane/platinum group catalyst. The composition cures into silicone rubber having a stabilized resistivity in the semiconductive region, especially in the range of $1 \times 10^3$ to $1 \times 10^{12}$ Ω-cm, even under high voltages. The composition is thus suitable as a semiconductive roll material for use as charging rolls, transfer rolls and developing rolls.

13 Claims, 1 Drawing Sheet

SEMICONDUCTIVE SILICONE RUBBER COMPOSITION AND SILICONE RUBBER ROLL

This invention relates to a semiconductive silicone rubber composition which cures into silicone rubber having a stable resistivity in the semiconductive region and is suitable as a roll material for use as rolls in business machines. It also relates to a silicone rubber roll obtained therefrom.

BACKGROUND OF THE INVENTION

A roll material is one application of rubber material in the business machine area. A wide variety of rubber materials including urethane elastomers, ethylene-propylene rubber and natural rubber as well as silicone rubber are currently used for such purposes. Composites of these materials are also known. These rubber materials have been used in a variety of applications as an electrically insulating material or an electroconductive material having a conductive agent blended therein for the purposes of reducing static-electrical charges and establishing electrical conduction paths. Recently, semiconductive materials having a resistivity in the medium range of $1 \times 10^3$ to $1 \times 10^{12}$ Ω-cm find use as a roll material in copiers.

Since a semiconductive roll material controls current flow therethrough by its own resistance in most service environments, the stability of its resistivity is very important in order to acquire a transfer capability. A voltage of 100 V to 10 kV is often applied across the roll material in order to stabilize the current flow therethrough and to provide effective electrical charges onto the organic photoconductor (OPC).

However, most semiconductive roll materials suffer from resistance instability because they use carbonaceous conductive agents. Under the high-voltage service environment, the stability of carbon as the conductor encounters a certain limit. During long-term service, the resistance deviates from the preset value due to failure of the carbon-to-carbon structure and volatilization of carbon. This problem becomes more outstanding as the applied voltage becomes higher and as more current is conducted. It is known that where conventional conductive carbon black is used, the current-to-voltage relationship does not follow Ohm's law and becomes nonlinear because of the tunnel effect of carbon structure (see L. K. H. van Beek and B. I. C. F. van Pul, J. Appl. Polymer Sci., 6, 651 (1962)). The nonlinearity between current and voltage is irrational as the properties of OPC-related rolls such as developing and transfer rolls whose resistance must be precisely controlled within the semiconductive region. This problem can be solved by adding phosphates as described in JP-A 6-192486 or potassium titanate whiskers as described in JP-A 63-86205 and JP-A 8-120176, but to an unsatisfactory extent. Also JP-A 10-176111 discloses a semiconductive silicone rubber composition having conductive titanium oxide whiskers blended therein, whose resistance is not fully stable under high voltages.

SUMMARY OF THE INVENTION

An object of the invention is to provide a semiconductive silicone rubber composition which cures into a silicone rubber having a stabilized resistance even under high voltages and exhibiting a nearly linear current-to-voltage relationship under high voltages and thus suitable as roll material. Another object of the invention is to provide a silicone rubber roll having such advantages.

It has been found that by blending acicular conductive titanium oxide and an antistatic agent having a metal ion-containing moiety in the molecule in an organopolysiloxane of the formula (1) shown below, there is obtained a silicone rubber composition which is readily workable and curable with an organic peroxide or an organohydrogenpolysiloxane/platinum group catalyst or a mixture of an organic peroxide and an organohydrogenpolysiloxane/platinum group catalyst. The composition cures into silicone rubber having improved compression set and stable conductivity or resistivity in the semiconductive region, especially in the range of $1 \times 10^3$ to $1 \times 10^{12}$ Ω-cm. Since the deterioration of the conductive agent under high voltages is prohibited, the molded or cured product experiences a minimal change of resistance and withstands long-term service. The composition is thus suitable as a semiconductive roll material for use as charging rolls, transfer rolls and developing rolls in business machines such as copiers, facsimile machines and printers.

The invention provides a semiconductive silicone rubber composition comprising (A) 100 parts by weight of an organopolysiloxane having at least two aliphatic unsaturated groups in the molecule represented by the following average compositional formula (1):

$$R^1{}_n SiO_{(4-n)/2} \qquad (1)$$

wherein $R^1$, which may be the same or different, is a substituted or unsubstituted monovalent hydrocarbon group and n is a positive number of 1.98 to 2.02, (B) 1 to 100 parts by weight of acicular conductive titanium oxide, (C) 0.5 to 50 parts by weight of an antistatic agent having a metal ion-containing moiety in the molecule, and (D) a sufficient amount to cure component (A) of a curing agent.

In one preferred embodiment, the composition further includes a blowing agent. Preferably the curing agent is a combination of an organohydrogenpolysiloxane with a platinum group catalyst or an organic peroxide or both.

The invention also provides a semiconductive silicone rubber roll comprising a semiconductive silicone rubber layer obtained by curing the composition.

BRIEF DESCRIPTION OF THE DRAWING

The only figure, FIG. 1 schematically illustrates an arrangement for measuring the resistance of a semiconductive rubber sheet.

DESCRIPTION OF THE PREFERRED EMBODIMENT

Figure 1:
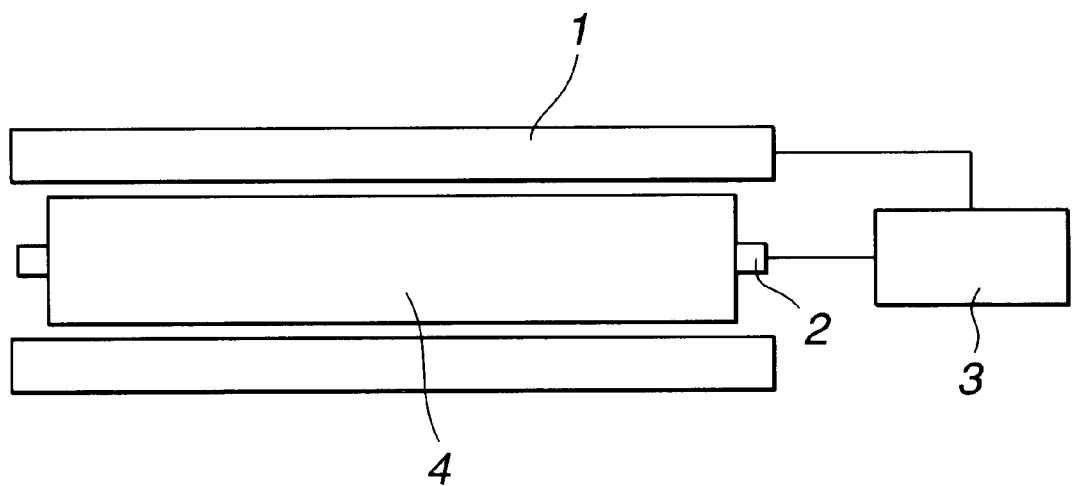

The essential component (A) in the semiconductive silicone rubber composition of the invention is an organopolysiloxane of the following average compositional formula (1):

$$R^1{}_n SiO_{(4-n)/2} \qquad (1)$$

wherein $R^1$, which may be the same or different, is a substituted or unsubstituted monovalent hydrocarbon group and n is a positive number of 1.98 to 2.02.

In formula (1), $R^1$ independently denotes substituted or unsubstituted monovalent hydrocarbon groups, preferably of 1 to 10 carbon atoms, more preferably 1 to 8 carbon atoms, for example, alkyl groups such as methyl, ethyl, propyl and butyl, cycloalkyl groups such as cyclohexyl, alkenyl groups such as vinyl, allyl, butenyl and hexenyl, aryl groups such as phenyl and tolyl, aralkyl groups such as benzyl and phenylethyl, and substituted ones of the foregoing groups in which some or all of the hydrogen atoms attached to carbon atoms are replaced by halogen atoms and cyano groups, such as chloromethyl, trifluoropropyl and cyanoethyl. It is essential that $R^1$ contain at least two aliphatic unsaturated groups, especially alkenyl groups. The preferred content of aliphatic unsaturated groups in $R^1$ is 0.001 to 20 mol %, and especially 0.025 to 5 mol %. Letter n is a positive number of 1.98 to 2.02. It is preferred that the organopolysiloxane of formula (1) be essentially linear. A mixture of two or more organopolysiloxanes having different molecular structures or degrees of polymerization is acceptable. The aliphatic unsaturated groups may be attached to the molecular chain at ends or intermediate positions although it is preferred that at least aliphatic unsaturated groups attached at ends be included.

Preferably the organopolysiloxane has an average degree of polymerization of about 100 to 20,000, and especially about 3,000 to 8,000.

The essential component (B) is acicular electro-conductive titanium oxide which is characteristic of the invention. The titanium oxide should preferably have a powder resistivity of up to 100 Ω-cm under a load of 100 kg/cm². With a powder resistivity above this level, the titanium oxide may fail to impart sufficient conductivity to the silicone rubber unless it is added in extremely large amounts. Such titanium oxide is commercially available under the trade name of FT1000 from Morishita Industry K.K. An appropriate amount of titanium oxide is 1 to 100 parts, and preferably 10 to 90 parts by weight per 100 parts by weight of the organopolysiloxane (A). Less than 1 part of titanium oxide fails to provide the desired electrical resistance whereas more than 100 parts adversely affects the workability of silicone rubber compound.

The acicular conductive titanium oxide is preferably of such shape as having a length of 0.5 to 50 μm and a diameter of 0.05 to 1 μm.

The essential component (C) is an antistatic agent which is also characteristic of the invention. The antistatic agent is not critical as long as it has a metal ionic group in its molecule and possesses antistatic properties. Preferred are polyethers having a moiety containing a metal ionic group in their molecule. These polyether compounds contain polyether, metal ion and counter ion moieties such that the metal ion within the molecule may develop conduction to make up for the electron conduction of the acicular conductive titanium oxide for synergistically reducing the voltage dependence of electric resistance of silicone rubber. The metal ion is exemplified by alkali metal ions and alkaline earth metal ions, with lithium ion (Li⁺) being preferred. Suitable antistatic agents are commercially available under the trade name of US600 series and USS600 series which are US600 adsorbed on silica, both from Sanken Kakou K.K. An appropriate amount of the antistatic agent is 0.5 to 50 parts, and preferably 5 to 50 parts by weight per 100 parts by weight of the organopolysiloxane (A).

The fourth essential component (D) is a curing agent which is (D-1) an addition reaction curing agent in the form of an organohydrogenpolysiloxane combined with a platinum group catalyst or (D-2) an organic peroxide catalyst.

In (D-1), the platinum group catalyst may be selected from well-known ones, for example, elemental platinum alone, platinum compounds, platinum composites, chloroplatinic acid, and complexes of chloroplatinic acid with alcohols, aldehydes, ethers and olefins. The platinum group catalyst is desirably added in such amounts as to give 1 to 2,000 ppm of platinum atom based on the organopolysiloxane (A).

The organohydrogenpolysiloxane may be linear, branched or cyclic. It is preferably of the following average composition formula (2):

$$H_bR^2_cSiO_{(4-b-c)/2} \quad (2)$$

wherein $R^2$ is a substituted or unsubstituted monovalent hydrocarbon group of 1 to 10 carbon atoms, especially 1 to 8 carbon atoms, as defined for $R^1$, preferably free of aliphatic unsaturation, b is a positive number of 0.002 to 1, c is a positive number of 1 to 2.2, and the sum of b+c is from 1.002 to 3.

Preferably the organohydrogenpolysiloxane has a degree of polymerization of up to 300. Examples include diorganopolysiloxane end-blocked with a dimethylhydrogensilyl group, copolymers of dimethylsiloxane, methylhydrogensiloxane and terminal trimethylsiloxy units, low viscosity fluids consisting essentially of dimethylhydrogensiloxane $(H(CH_3)_2SiO_{1/2})$ units and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

Desirably the organohydrogenpolysiloxane is added as the curing agent in such amounts that the hydrogen atoms directly attached to silicon atoms (i.e., SiH groups) therein account for 50 to 500 mol % based on the aliphatic unsaturated groups (especially alkenyl groups) on the organopolysiloxane (A).

Examples of the organic peroxide catalyst (D-2) include benzoyl peroxide, 2,4-dichlorobenzoyl peroxide, p-methylbenzoyl peroxide, 2,4-dicumyl peroxide, 2,5-dimethyl-bis(2,5-t-butylperoxy)hexane, di-t-butyl peroxide, and t-butyl perbenzoate. An appropriate amount of the organic peroxide added is 0.1 to 10 parts, and especially 0.2 to 5 parts by weight per 100 parts by weight of the organopolysiloxane (A).

In addition to the above essential components, reinforcing silica powder is optionally added to the silicone rubber composition insofar as it does not compromise the benefits of the invention. Reinforcing silica powder is generally added for the purpose of providing the silicone rubber with improved mechanical strength and for that purpose, silica powder having a specific surface area of at least 50 m²/g, especially 100 to 300 m²/g is advantageous. With a specific surface area of less than 50 m²/g, the cured product is degraded in mechanical strength. Exemplary of the reinforcing silica are fumed silica and precipitated silica, which may be surface treated with chlorosilane, hexamethyldisilazane or other coupling agents to be hydrophobic.

An appropriate amount of reinforcing silica powder added is about 5 to 70 parts, especially about 10 to 50 parts by weight per 100 parts by weight of the organopolysiloxane (A). Less than 5 parts of silica is too small to achieve reinforcement whereas more than 70 parts may exacerbate workability and rather adversely affect mechanical strength.

Additionally, conductive agents such as carbon black and other conductive inorganic oxides, e.g., conductive zinc oxide may be added as well as extender fillers such as silicone rubber powder, red iron oxide, ground quartz and calcium carbonate.

Where it is desired to form sponge, any of organic or inorganic blowing agent is added to the composition. Exemplary blowing agents include azobisisobutyronitrile, dinitropentamethylene tetramine, benzenesulfonyl hydrazide, and azodicarbonamide. The preferred amount of the blowing agent added is about 1 to 10 parts by weight per 100 parts by weight of the silicone rubber compound. By adding the blowing agent to the composition, a spongy silicone rubber is obtainable.

If desired, additives such as colorants and heat resistance modifiers are added to the inventive composition as well as reaction regulators, parting agents and filler dispersants. Exemplary filler dispersants are diphenylsilane diol, alkoxysilanes, carbon functional silanes, and silanol group-bearing low molecular weight siloxanes, and their addition is preferably limited to the minimum effective amount so as not to compromise the benefits of the invention.

The silicone rubber composition can be rendered flame retardant and fireproof by incorporating therein well-known additives such as platinum-containing materials, platinum compounds combined with titanium dioxide, platinum combined with manganese carbonate, platinum combined with $\gamma$-$Fe_2O_3$, ferrite, mica, glass fibers, and glass flakes.

The silicone rubber composition is usually prepared by uniformly mixing the essential and optional components in a rubber kneader such as a two-roll mill, Banbury mixer or dough mixer, followed by optional heat treatment.

The semiconductive silicone rubber composition thus obtained can be molded into the desired shape for a particular application by well-known molding methods such as compression molding and extrusion molding. Preferred curing conditions include 80 to 400° C. and 10 seconds to 30 days although they are determined as appropriate depending on the curing process and the thickness of a molded product.

The semiconductive silicone rubber composition of the invention finds best use as a semiconductive roll material to form charging rolls, transfer rolls, developing rolls and other rolls in business machines. A particular type of roll can be manufactured by any well-known method suitable therefor. For example, the silicone rubber composition is applied to and cured on a metal mandrel to form a concentric semi-conductive silicone rubber layer therearound. The roll is not limited to this type as long as it has a semiconductive silicone rubber layer of the semiconductive silicone rubber composition.

It is noted that the cured product (i.e., silicone rubber) of the semiconductive silicone rubber composition according to the invention should preferably have a resistivity of $1\times10^3$ to $1\times10^{12}$ $\Omega$-cm, more preferably $1\times10^4$ to $1\times10^1$ $\Omega$-cm, and most preferably $1\times10^5$ to $1\times10^9$ $\Omega$-cm. Advantageously, the resistivity is stabilized within this range such that the resistivity under an applied voltage of 4000 V divided by the resistivity under an applied voltage of 100 V is at least 0.3, and especially at least 0.4.

There has been described a semiconductive silicone rubber composition having blended therein specific amounts of acicular conductive titanium oxide and an antistatic agent having a metal ion-containing moiety in the molecule so that it is stabilized against a change of resistivity and thus offers a roll material suitable for use under high voltage. The composition is useful as a roll material capable of withstanding long-term service under high voltage and more specifically, a semiconductive roll material having a resistivity in the range of $1\times10^3$ to $1\times10^{12}$ $\Omega$-cm, which is advantageously used to construct charging rolls, transfer rolls, developing rolls and other rolls in business machines.

EXAMPLE

Examples of the invention are given below by way of illustration and not by way of limitation. All parts are by weight.

Examples 1 and 2

To 100 parts of rubbery organopolysiloxane consisting of 99.825 mol % of dimethylsiloxane units, 0.15 mol % of methylvinylsiloxane units and 0.025 mol % of dimethylvinylsiloxane units and having an average degree of polymerization of about 5,000 were added 50 parts of acicular conductive titanium oxide FT1000 (Morishita Industry K.K.), and 10 or 20 parts of an antistatic agent US600-5 (Sanken Kakou K.K.). These ingredients were milled on a roll mill, yielding a base compound.

To 100 parts of the base compound were added 2 parts of organic peroxide C-21 (Shin-Etsu Chemical Co., Ltd.) as a curing agent and 1.5 parts of azobisisobutyronitrile as a blowing agent. The resulting composition was mixed and extruded through a 40-mm extruder onto a 6-mm diameter metal mandrel which had been surface treated with a primer 101A/B (Shin-Etsu Chemical Co., Ltd.), and treated at 200° C. for 30 minutes, obtaining an expanded roll layer. The roll layer was polished to a diameter of 12 mm by an abrasive tool, obtaining a semiconductive sponge roll.

The sponge roll was tested by an arrangement as shown in FIG. 1. The sponge roll 4 on a metal mandrel 2 was sandwiched between a pair of electrodes 1. The mandrel 2 and the electrode 1 were connected to a resistance meter Trek 3. The resistance between the electrode 1 and the mandrel 2 was measured under an applied voltage of 100 V, 1,000 V and 4,000 V. The results are shown in Table 1.

Comparative Examples 1 and 2

For comparison purposes, a roll was manufactured as in Example 1 without using the antistatic agent, and another roll was manufactured using 17 parts of acetylene black having a primary particle diameter of 40 nm and a DBP oil absorption of 110 cc/100 g (Denki Kagaku Kougyo K.K.) instead of the acicular conductive titanium oxide. The test results are also shown in Table 1.

TABLE 1

| Composition (pbw) | E1 | E2 | CE1 | CE2 |
|---|---|---|---|---|
| Organopolysiloxane | 100 | 100 | 100 | 100 |
| FT1000 | 50 | 50 | 50 | — |
| US600-5 | 10 | 20 | — | — |
| Acetylene black | — | — | — | 17 |
| Resistance at 100 V ($\Omega$) | $1.0\times10^7$ | $1.0\times10^6$ | $>1.0\times10^{12}$ | $9.0\times10^7$ |
| Resistance at 1000 V ($\Omega$) | $5.0\times10^6$ | $6.0\times10^5$ | $>1.0\times10^{12}$ | $8.0\times10^6$ |
| Resistance at 4000 V ($\Omega$) | $3.0\times10^6$ | $4.0\times10^5$ | $>1.0\times10^{12}$ | $8.0\times10^5$ |

Example 3

To 100 parts of rubbery organopolysiloxane consisting of 99.825 mol % of dimethylsiloxane units, 0.15 mol % of methylvinylsiloxane units and 0.025 mol % of dimethylvinylsiloxane units and having an average degree of polymerization of about 5,000 were added 4 parts of silanol end-blocked dimethylpolysiloxane (degree of polymerization=10) as a dispersant and 20 parts of treated silica having a specific surface area of 200 m²/g (Nippon Aerosil K.K.). The mixture was heat treated at 160° C. for 2 hours, yielding a base compound.

To 100 parts of the base compound were added 70 parts of acicular conductive titanium oxide FT2000 (Morishita Industry K.K.), and 40 parts of an ion-conducting antistatic agent USS600-50 (Sanken Kakou K.K.). These ingredients were milled to give a compound.

The compound, 100 parts, was milled with 0.5 part of 2,5-dimethyl-2,5-di(t-butylperoxy)hexane as a curing agent. The resulting compound was compression molded around a 6-mm diameter aluminum mandrel to form a roll having a diameter of 12 mm and a rubber wall thickness of 3 mm. The compression molding conditions included 165° C., 10 minutes and 34.3 kPa (35 kgf/cm$^2$).

Comparative Example 3

A roll was manufactured as in Example 3 except that the ion-conducting antistatic agent USS600-50 was replaced by wet silica Nipsil LP (Nippon Silica K.K.).

The rolls of Example 3 and Comparative Example 3 were tested as in Example 1, with the result shown in Table 2.

TABLE 2

| Composition (pbw) | E3 | CE3 |
|---|---|---|
| Organopolysiloxane | 100 | 100 |
| FT2000 | 70 | 70 |
| USS600-50 | 40 | — |
| Nipsil LP | — | 40 |
| Resistance at 100 V (Ω) | $1.0 \times 10^9$ | $>1.0 \times 10^{12}$ |
| Resistance at 1000 V (Ω) | $6.0 \times 10^8$ | $>1.0 \times 10^{12}$ |
| Resistance at 4000 V (Ω) | $3.0 \times 10^8$ | $>1.0 \times 10^{12}$ |

As is evident from Tables 1 and 2, the rolls molded from the semiconductive silicone rubber compositions within the scope of the invention maintain a stable resistivity in the semiconductive region.

Japanese Patent Application No. 11-351246 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A semiconductive silicone rubber composition comprising
   (A) 100 parts by weight of an organo-poly-siloxane represented by the following average compositional formula (1):

$$R^1{}_n SiO_{(4-n)/2} \quad (1)$$

wherein $R^1$, which may be the same or different, is a substituted or unsubstituted monovalent hydrocarbon group, provided that $R^1$ contains at least two aliphatic unsaturated groups, and n is a positive number of 1.98 to 2.02,
   (B) 1 to 100 parts by weight of acicular conductive titanium oxide,
   (C) 0.5 to 50 parts by weight of an antistatic agent having a metal ion-containing moiety in the molecule, and
   (D) a sufficient amount to cure component (A) of a curing agent.

2. The composition of claim 1, further comprising (E) a blowing agent.

3. The composition of claim 1, wherein the curing agent is a combination of an organo-hydrogen-polysiloxane with a platinum group catalyst or an organic peroxide or both.

4. A semiconductive silicone rubber roll which comprises a semiconductive silicone rubber layer obtained by curing the composition of claim 1.

5. The composition of claim 2, wherein the curing agent is a combination of an organo-hydrogen-polysiloxane with a platinum group catalyst or an organic peroxide or both.

6. The semiconductive silicone rubber roll of claim 4, comprising a semiconductive silicone rubber layer that is compression molded around an aluminum mandrel.

7. A semiconductive silicone rubber roll which comprises a semiconductive silicone rubber layer obtained by curing the composition of claim 2.

8. The semiconductive silicone rubber roll of claim 7, comprising a foamed semiconductive silicone rubber layer that is extruded onto a metal mandrel.

9. The semiconductive silicone rubber composition of claim 1, wherein $R^1$ contains from 0.001 to 20 mol% alkenyl groups.

10. The semiconductive silicone rubber composition of claim 1, wherein said composition contains 10 to 90 parts by weight of component (B).

11. The semiconductive silicone rubber composition of claim 1, wherein said acicular titanium oxide has a length of 0.5 to 50 μm and a diameter of 0.05 to 1 μm.

12. The semiconductive silicone rubber composition of claim 1, wherein said antistatic agent is a polyether containing a metal ionic group in the molecule.

13. The semiconductive silicon rubber roll of claim 4, wherein the roll is selected from the group consisting of charging rolls, transfer rolls, and developing rolls.

* * * * *